(12) United States Patent
Rivers, Jr. et al.

(10) Patent No.: US 7,839,611 B2
(45) Date of Patent: Nov. 23, 2010

(54) PROGRAMMABLE LOGIC CONTROLLER HAVING MICRO-ELECTROMECHANICAL SYSTEM BASED SWITCHING

(75) Inventors: Cecil Rivers, Jr., Hartford, CT (US); Brent Charles Kumfer, Farmington, CT (US); William James Premerlani, Scotia, NY (US); Kanakasabapathi Subramanian, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 342 days.

(21) Appl. No.: 11/939,729

(22) Filed: Nov. 14, 2007

(65) Prior Publication Data

US 2009/0125124 A1    May 14, 2009

(51) Int. Cl.
*H02H 3/08* (2006.01)
(52) U.S. Cl. ............................ 361/33; 361/87; 318/474; 200/181; 335/78; 700/18
(58) Field of Classification Search ................. 370/390, 370/432, 220; 361/33, 87; 358/405; 709/238; 398/5; 375/308, 295; 200/181; 318/474; 335/78; 700/18
See application file for complete search history.

(56) References Cited

U.S. PATENT DOCUMENTS

| | | | |
|---|---|---|---|
| 3,496,409 A | 2/1970 | Connell | |
| 4,384,289 A | 5/1983 | Stillwell et al. | |
| 4,723,187 A | 2/1988 | Howell | |
| 4,827,272 A | 5/1989 | Davis | |
| 4,847,780 A | 7/1989 | Gilker et al. | |
| 5,374,792 A | 12/1994 | Ghezzo et al. | |
| 5,426,360 A | 6/1995 | Maraio et al. | |
| 5,430,597 A | 7/1995 | Bagepalli et al. | |
| 5,454,904 A | 10/1995 | Ghezzo et al. | |
| 5,502,374 A | 3/1996 | Cota | |
| 5,757,319 A * | 5/1998 | Loo et al. ............... 342/375 |
| 5,889,643 A | 3/1999 | Elms | |
| 5,938,735 A * | 8/1999 | Malik ..................... 709/238 |
| 5,940,260 A | 8/1999 | Gelbien et al. | |

(Continued)

FOREIGN PATENT DOCUMENTS

DE    19846639 A1    4/2000

(Continued)

OTHER PUBLICATIONS

European Search Report for European Application No. 07110554.8; European Filing Date of Oct. 19, 2007; Mailing Date of Oct. 30, 2007; (6 pgs).

(Continued)

*Primary Examiner*—Paul Ip
(74) *Attorney, Agent, or Firm*—Cantor Colburn LLP

(57) ABSTRACT

A programmable logic controller is disclosed. The programmable logic controller includes control circuitry integrally arranged with a current path and at least one micro electromechanical system (MEMS) switch disposed in the current path. The programmable logic controller further includes a hybrid arcless limiting technology (HALT) circuit connected in parallel with the at least one MEMS switch facilitating the opening of the at least one MEMS switch. The programmable logic controller also may include a MEMS switch and a voltage sensor for measuring the voltage across the MEMS switch. The MEMS switches are arranged to transmit or receive logic signals.

20 Claims, 9 Drawing Sheets

U.S. PATENT DOCUMENTS

| | | | |
|---|---|---|---|
| 5,943,223 A | 8/1999 | Pond | |
| 5,953,314 A * | 9/1999 | Ganmukhi et al. | 370/220 |
| 5,973,896 A | 10/1999 | Hirsh et al. | |
| 5,987,098 A * | 11/1999 | Wintour | 379/3 |
| 6,054,659 A | 4/2000 | Lee et al. | |
| 6,081,741 A * | 6/2000 | Hollis | 600/424 |
| 6,150,901 A * | 11/2000 | Auken | 333/174 |
| 6,275,366 B1 | 8/2001 | Gelbien et al. | |
| 6,304,579 B1 * | 10/2001 | Malik | 370/432 |
| 6,308,231 B1 | 10/2001 | Galecki et al. | |
| 6,496,282 B1 * | 12/2002 | Malik | 358/405 |
| 6,496,504 B1 * | 12/2002 | Malik | 370/390 |
| 6,563,683 B1 | 5/2003 | Strumpler | |
| 6,606,427 B1 * | 8/2003 | Graves et al. | 385/17 |
| 6,738,246 B1 | 5/2004 | Strumpler | |
| 6,904,471 B2 | 6/2005 | Boggs et al. | |
| 6,912,427 B1 * | 6/2005 | Pattee et al. | 700/13 |
| 6,999,677 B2 * | 2/2006 | Graves et al. | 398/5 |
| 7,212,739 B2 * | 5/2007 | Graves et al. | 398/5 |
| 7,447,273 B2 * | 11/2008 | Hsu et al. | 375/295 |
| 2001/0014949 A1 | 8/2001 | Leblanc | |
| 2002/0008149 A1 | 1/2002 | Riley et al. | |
| 2002/0064336 A1 * | 5/2002 | Graves et al. | 385/17 |
| 2002/0145841 A1 | 10/2002 | Williams et al. | |
| 2002/0188887 A1 * | 12/2002 | Largman et al. | 714/13 |
| 2003/0050737 A1 | 3/2003 | Osann, Jr. | |
| 2003/0185488 A1 * | 10/2003 | Blumenthal | 385/16 |
| 2003/0212473 A1 | 11/2003 | Vandevanter | |
| 2004/0032320 A1 | 2/2004 | Zalitzky et al. | |
| 2004/0113713 A1 | 6/2004 | Zipper et al. | |
| 2004/0263125 A1 | 12/2004 | Kanno et al. | |
| 2005/0085928 A1 | 4/2005 | Shani | |
| 2005/0104621 A1 * | 5/2005 | Kawahara et al. | 326/39 |
| 2005/0180521 A1 * | 8/2005 | Hsu et al. | 375/295 |
| 2005/0248340 A1 | 11/2005 | Berkcan et al. | |
| 2005/0270014 A1 | 12/2005 | Zribi et al. | |
| 2006/0121785 A1 | 6/2006 | Caggiano et al. | |
| 2006/0187688 A1 | 8/2006 | Tsuruya | |
| 2006/0202933 A1 | 9/2006 | Pasch et al. | |
| 2007/0013357 A1 | 1/2007 | Huang et al. | |
| 2007/0057746 A1 | 3/2007 | Rubel | |
| 2007/0139830 A1 | 6/2007 | Premerlani et al. | |
| 2007/0142938 A1 | 6/2007 | Huang | |
| 2007/0173960 A1 | 7/2007 | Kumar | |
| 2007/0212066 A1 * | 9/2007 | Winh et al. | 398/45 |
| 2009/0074109 A1 * | 3/2009 | Foo | 375/308 |

FOREIGN PATENT DOCUMENTS

| | | |
|---|---|---|
| DE | 19850397 A1 | 5/2000 |
| DE | 19927762 A1 | 1/2001 |
| EP | 0072422 A1 | 2/1983 |
| EP | 0233756 A1 | 8/1987 |
| EP | 0774822 A1 | 5/1997 |
| EP | 1255268 A1 | 11/2002 |
| EP | 1463081 A2 | 9/2004 |
| EP | 1610142 A1 | 12/2005 |
| EP | 1643324 A2 | 4/2006 |
| EP | 1681694 A1 | 7/2006 |
| GB | 2123627 A | 2/1984 |
| WO | 9946606 A2 | 9/1999 |
| WO | 0004392 A1 | 1/2000 |
| WO | 2006078944 A2 | 7/2006 |
| WO | 2006100192 A1 | 9/2006 |

OTHER PUBLICATIONS

"Power Circuit Breaker Using Micro-Mechanical Switches"; Authors: George G. Karady and Gerald Thomas Heydt; Int J. Critical Infrastructure, vol. 3, Nos. 1/2, 2007; pp. 88-100; XP008087882.

"MEMS Based Electronic Circuit Breaker as a Possible Component for and Electrical Ship", Authors: George G. Karady and Gerald T. Heydt; IEEE Electric Ship Technologies Symposium, 2005; pp. 214-218; XP-002468154.

"Advanced MEMS for High Power Integrated Distribution Systems"; Authors: Rahim Kasim, Bruce C. Kim and Josef Drobnik; IEEE Computer; Proceedings of the International Conference on MEMS, NANO and Smart Systems, 2005; pp. 1-6.

PCT International Search Report; International Application No. PCT/US2007/014379; International Filing Date Jun. 20, 2007; Date of Mailing Feb. 11, 2008.

PCT International Search Report; International Application No. PCT/US2007/071644; International Filing Date Jun. 20, 2007; Date of Mailing Feb. 13, 2008.

PCT International Search Report; International Application No. PCT/US2007/071624; International Filing Date Jun. 20, 2007; Date of Mailing Feb. 18, 2008.

PCT International Search Report; International Application No. PCT/US2007/071627; International Filing Date Jun. 20, 2007; Date of Mailing Feb. 29, 2008.

PCT International Search Report; International Application No. PCT/US2007/071630; International Filing Date Jun. 20, 2007; Date of Mailing Mar. 7, 2008.

PCT Written Opinion of the International Searching Authority; International Application No. PCT/US2007/071630; International Filing Date Jun. 20, 2007; Date of Mailing Mar. 7, 2008.

PCT International Search Report; International Application No. PCT/US2007/071632; International Filing Date Jun. 20, 2007; Date of Mailing Feb. 29, 2008.

PCT Written Opinion of the International Searching Authority; International Application No. PCT/US2007/071632; International Filing Date Jun. 20, 2007; Date of Mailing Feb. 29, 2008.

PCT International Search Report; International Application No. PCT/US2007/014363; International Filing Date Jun. 20, 2007; Date of Mailing Mar. 4, 2008.

PCT International Search Report; International Application No. PCT/US2007/071656; International Filing Date Jun. 20, 2007; Date of Mailing Mar. 12, 2008.

PCT International Search Report; International Application No. PCT/US2007/071654; International Filing Date Jun. 20, 2007; Date of Mailing Mar. 13, 2008.

PCT International Search Report; International Application No. PCT/US2007/014362; International Filing Date Jun. 20, 2007; Date of Mailing Mar. 20, 2008.

PCT International Search Report; International Application No. PCT/US2007/071643; International Filing Date Jun. 20, 2007; Date of Mailing Feb. 8, 2008.

PCT Written Opinion of the International Searching Authority; International Application No. PCT/US2007/071643; International Filing Date Jun. 20, 2007; Date of Mailing Feb. 8, 2008.

"Novel Concept for Medium Voltage Circuit Breakers Using Microswitches"; Authors: George G. Karady and G.T. Heydt; IEEE Transactions on Power Delivery, vol. 21, No. 1, Jan. 2006; pp. 536-537.

European Search Report; Application No. 07110554.8; Date of Mailing Oct. 30, 2007.

USPTO Office Action dated Oct. 17, 2008; Filing Date: Jun. 19, 2007; First Named Inventor: William James Premerlani; Confirmation No. 6421.

USPTO Office Action dated Oct. 24, 2008; Filing Date: Jun. 15, 2007; First Named Inventor: William James Permerlani; Confirmation No. 4167.

USPTO Office Action dated Oct. 28, 2008; Filing Date: Jun. 8, 2007; First Named Inventor: Cecil Rivers, Jr.; Confirmation No. 7895.

English Abstract for DE 19846639A1; Publication Date: Apr. 27, 2000; 1 pg.

EP Search Report for EP Application No.: 08168549.7; Date of Mailing: Mar. 3, 2009; 8 pgs.

* cited by examiner

PROGRAMMABLE LOGIC CONTROLLER HAVING MICRO-ELECTROMECHANICAL SYSTEM BASED SWITCHING

BACKGROUND OF THE INVENTION

The present invention generally relates to a programmable logic controller, and more particularly to a programmable logic controller that uses micro-electromechanical system based switching devices to provide a digital input and output interface.

Programmable logic controllers ("PLCs") are widely used for automation and control. These include industrial automation, factory automation, building automation and the like. PLCs are typically programmed by users with a control program to implement their desired functionality. The control program will be written in a programming language, such as ladder logic for example, to execute the desired control. For example, a PLC may monitor input conditions such as motor speed, temperature, pressure, volumetric flow and the like. The control program is stored in memory within the PLC to instruct the PLC on what actions to take upon encountering certain input signals or conditions.

PLCs do not usually connect directly with the devices that they control. An interface module, or input/out module ("I/O module") is used to provide the necessary connections and adapt the signals into a usable form for both the device and the PLC. The I/O module further protects the PLC from abnormal electrical faults such as short circuit conditions. I/O modules are typically mounted into respective slots located on a backplane board in a PLC. The slots are coupled together by a main bus that couples any I/O modules to a central processing unit ("CPU").

Two types of devices that are typically used to interface the PLC with higher electrical power applications are electromechanical relays and solid-state devices. These devices allow the PLC that is a digital logic device that operates using a 5 VDC circuit, to control devices that operate at higher voltages and currents, 24 Vdc or 120 Vac for example.

A relay is an electromechanical switch that uses an electromagnet to operate. To switch on/off current in electrical systems, a set of contacts may be used. The contacts may be either in an open position, resulting in the stopping of current flow, or in a closed position that allows current flow. A coil within the relay is energized creating a magnetic field that acts on an armature. The armature is mechanically connected to the contact that causes the contact to move under the magnetic field created by the coil. The movement either makes or breaks the electrical connection created by the contact. Relays provide advantages of being highly reliable and wide varieties are readily available. Thus the correct relay may be easily matched with the application. However, these electromechanical switches tend to be slow to operate and also need to be designed or selected for a particular power level. Since the relay operates at only one power level, the scalability of the device is limited. Further, relays do not provide protection for themselves or the circuits that they drive.

As an alternative to slow electromechanical switches, fast solid-state switches, such as a bipolar junction transistor or a metal-oxide-semiconductor field-effect transistor ("MOSFET") for example, have been employed in direct-current applications at low power levels. These solid-state switches switch between a conducting state and a non-conducting state through controlled application of a voltage or bias. For example, by reverse biasing a solid-state switch, the switch may be transitioned into a non-conducting state. However, because solid-state switches do not create a physical gap between contacts as they are switched into a non-conducing state, they experience leakage current. Since there is no physical gap, the electrical protection provided by the solid-state switch is limited. Further, similar to the relay, the solid-state switches are sized for a particular electrical power level and therefore have limited scalability.

While existing I/O module technology is adequate for its intended purposes, there exists a need in the art for a PLC having an I/O module that is provides scalability and electrical fault protection that overcomes these drawbacks.

BRIEF DESCRIPTION OF THE INVENTION

A programmable logic controller is provided having a central processing unit. A digital input/output interface is operably coupled to the central processing unit. The digital input/output interface has at least one input terminal and at least one output terminal. A micro-electromechanical system ("MEMS") switch connected to each of the at least one input terminal and to each of the at least one output terminal thereby defining input MEMS switches and output MEMS switches. Each MEMS switch has a source connection, a drain connection and gate connection.

An input/output interface module for a programmable logic controller is also provided having a programmable logic controller interface. At least one interface terminal is electrically coupled to the controller interface. At least one MEMS switch is connected to the interface terminal where the MEMS switch has a source connection, a drain connection and a gate connection. A gate driver is coupled to each of the MEMS switches and a circuit is electrically connected with the gate driver switch to facilitate the opening of the MEMS switch.

A programmable logic controller is also provided having a central processing unit. An interface module is electrically coupled to the central processing unit. The interface module further includes at least one first MEMS switch having a drain connection, a source connection and a gate connection. A gate driver is operably coupled to the first MEMS switch and is electrically coupled to receive a first logic signal from the central processing unit.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

An exemplary embodiment provides a programmable logic controller ("PLC") having scalable interfaces with electrical protection that is suitable for providing digital control of external devices. The input/output interface modules ("I/O modules") include micro electromechanical system (MEMS) switches. Use of MEMS switches provides fast response time and also provides an interface between the digital logic circuits of the PLC and the higher power external circuits. A Hybrid Arcless Limiting Technology (HALT) circuit connected in parallel with the MEMS switches provides capability for the MEMS switches to be opened without arcing at any given time regardless of current or voltage. Alternatively, a Pulse-Assisted Turn On (not shown) circuit connected in parallel with the MEMS switches provides capability for the MEMS switches to be closed without arcing at any given time.

Figure 1:
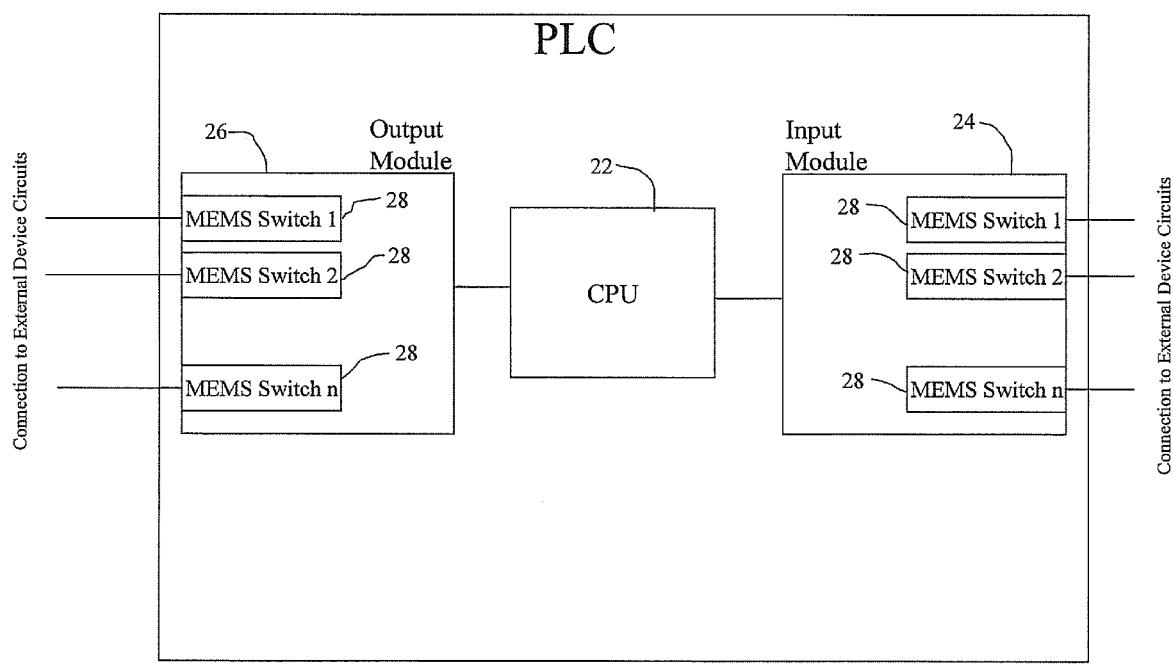
FIG. 1 is a block diagram of an exemplary PLC having an I/O module with a MEMS based switching system in accordance with an exemplary embodiment.

FIG. 1 illustrates a block diagram of an exemplary PLC 20 having I/O modules 24, 26 that include MEMS based switching system 28 having a plurality of MEMS switches designated "MEMS Switch 1", "MEMS Switch 2" to "MEMS Switch n". The MEMS switches connected to the input module 24 are herein referred to as input MEMS switches, and the MEMS switches connected to the output module 26 are likewise herein referred to as output MEMS switches. The PLC 20 includes a central processing unit ("CPU") 22 that is arranged to receive signals from the input module 24. The input module 22 receives signals indicating conditions from external devices, a motor controller or a temperature sensor for example. The circuitry within the PLC 20 is typically low voltage, 5 VDC for example, and the MEMS switch 28 converts the external signal into a form usable by the logic circuits connected to CPU 22. The output module 26 is arranged to receive signals from the CPU 22. The MEMS switch 28 within the output module 26 converts the signal into a form usable by the external device and transmits the signal thereto. As will be described in more detail herein, the I/O modules provide an isolation barrier between the external devices and the logic circuits connected to CPU 22. It should be appreciated that while input module 24 and output module 26 are described herein for the purpose of clarity as two separate components, the I/O modules may be combined into a single component that may be configured to operate as either an input module or an output module or a combination thereof.

The CPU 22 is typically an application-specific integrated circuit ("ASIC") that includes a microprocessor, random-access memory ("RAM") and read-only memory ("ROM"). The ROM contains the operating system for the PLC 20 and may either be EPROM or Flash EPROM depending on the type of PLC. The RAM is used for operating system data storage as well as storing control programs that the operator has compiled into executable code. The CPU 22 may further have additional components in the digital logic circuit such as universal asynchronous receiver transmitters, conditioning circuits, high speed counters, watchdog circuitry and bus interfaces for example.

Figure 2:
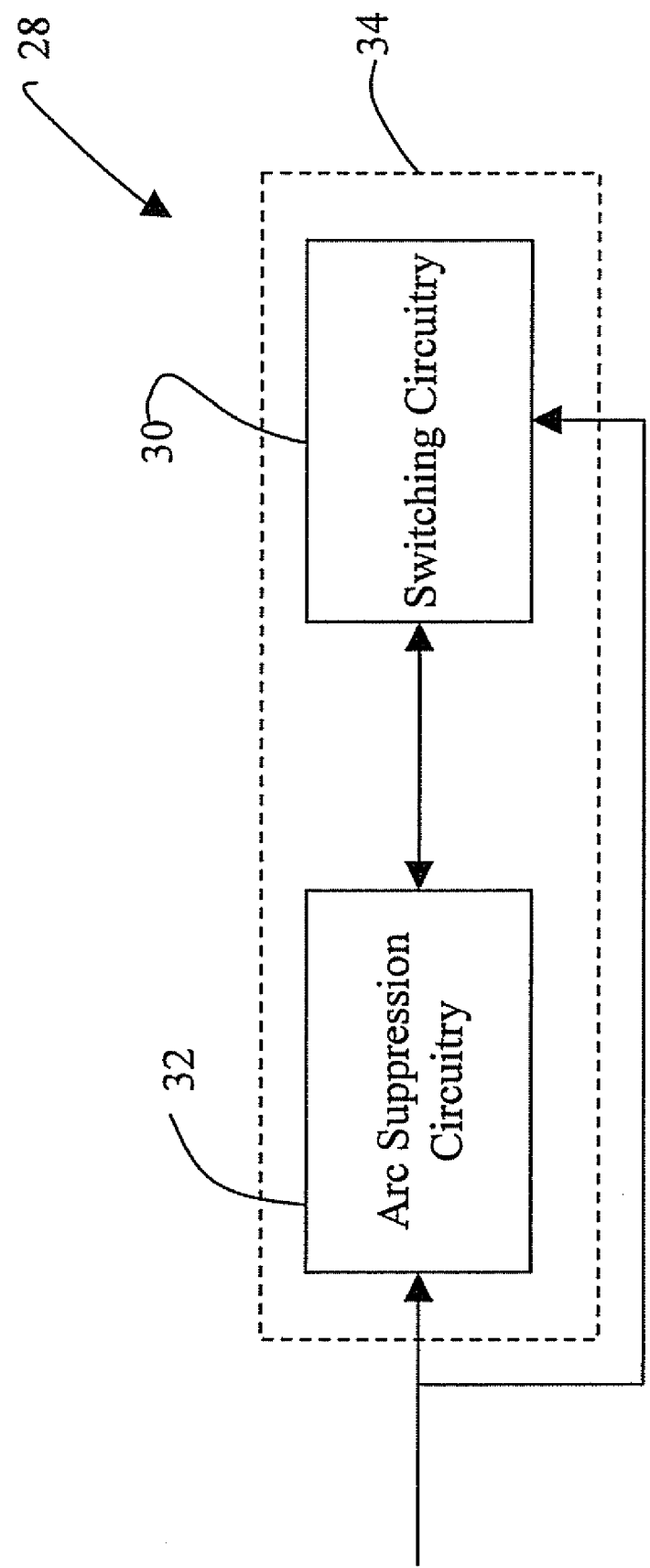
FIG. 2 is a block diagram of an exemplary MEMS based switching system in accordance with an exemplary embodiment.

FIG. 2 illustrates a block diagram of an exemplary arc-less micro-electromechanical system switch (MEMS) based switching system 28. Presently, MEMS generally refer to micron-scale structures that for example can integrate a multiplicity of functionally distinct elements, for example, mechanical elements, electromechanical elements, sensors, actuators, and electronics, on a common substrate through micro-fabrication technology. It is contemplated, however, that many techniques and structures presently available in MEMS devices will in just a few years be available via nanotechnology-based devices, for example, structures that may be smaller than 100 nanometers in size. Accordingly, even though example embodiments described throughout this document may refer to MEMS-based switching devices, it is submitted that the embodiments should be broadly construed and should not be limited to micron-sized devices.

As illustrated in FIG. 2, the arc-less MEMS based switching system 28 is shown as including MEMS based switching circuitry 30 and arc suppression circuitry 32, where the arc suppression circuitry 32, alternatively referred to as a Hybrid Arcless Limiting Technology (HALT) device, is operatively coupled to the MEMS based switching circuitry 30. In certain embodiments, the MEMS based switching circuitry 30 may be integrated in its entirety with the arc suppression circuitry 32 in a single package 34, for example. In other embodiments, only certain portions or components of the MEMS based switching circuitry 30 may be integrated with the arc suppression circuitry 32.

In a presently contemplated configuration as will be described in greater detail with reference to FIG. 3, the MEMS based switching circuitry 30 may include one or more MEMS switches. Additionally, the arc suppression circuitry 32 may include a balanced diode bridge and a pulse circuit. Further, the arc suppression circuitry 32 may be configured to facilitate suppression of an arc formation between contacts of the one or more MEMS switches by receiving a transfer of electrical energy from the MEMS switch in response to the MEMS switch changing state from closed to open. It may be noted that the arc suppression circuitry 32 may be configured to facilitate suppression of an arc formation in response to an alternating current (AC) or a direct current (DC).

Figure 3:
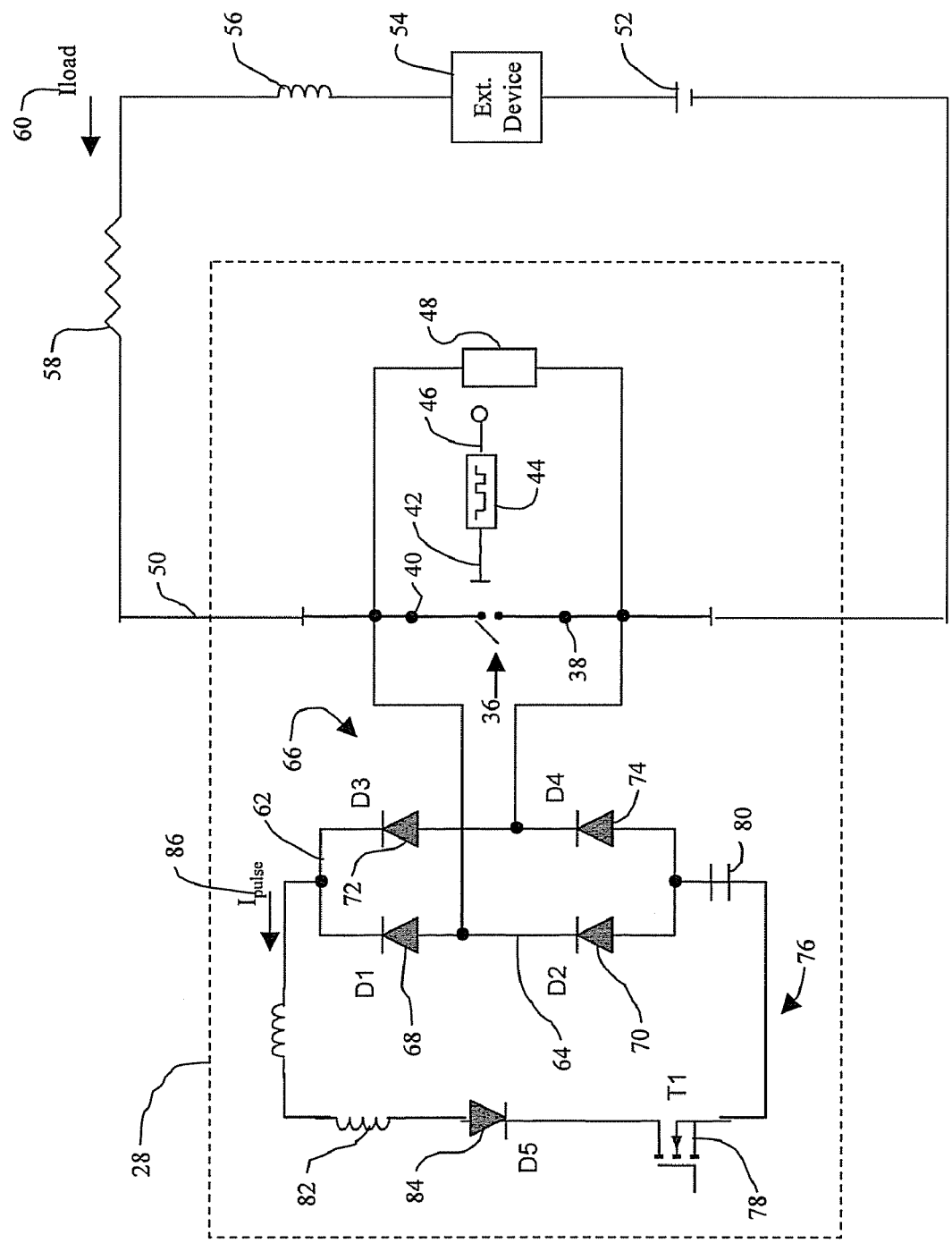
FIG. 3 is a schematic diagram illustrating an exemplary MEMS switch depicted in FIG. 2.

The MEMS based switching circuitry 30 may include a MEMS switch 36 as shown in FIG. 3. In the illustrated embodiment, a MEMS switch 36 is depicted as having a first connection 38, a second connection 40 and a third connection 42. In one embodiment, the first connection 38 may be configured as a drain, the second connection 40 may be configured as a source and the third connection 42 may be configured as a gate. The gate connection 42 is connected to a gate driver 44. The gate driver 44 includes a power supply input (not shown) and control logic input 46 that is connected to receive signals from the CPU 22 and provide the means for changing the state of MEMS switch 36. It should be appreciated that while the MEMS switch 36 is illustrated as a single switch, two or more switches may be combined in parallel, in series, or some combination thereof to provide the necessary voltage and current capacity needed for the application. In the exemplary embodiment, the MEMS switch 28 is configured in a modular arrangement to allow the addition or subtraction of MEMS switches to provide the necessary interface with the desired external device. As used herein, MEMS switching system 28 depicts a system that incorporates MEMS switching circuitry 30, which in turn depicts circuitry that incorporates MEMS switch 36.

A voltage snubber circuit 48 may be coupled in parallel with the MEMS switch 36 and configured to limit voltage overshoot during fast contact separation as will be explained in greater detail hereinafter. In certain embodiments, the snubber circuit 48 may include a snubber capacitor coupled in series with a snubber resistor. The snubber capacitor may facilitate improvement in transient voltage sharing during the sequencing of the opening of the MEMS switch 36. Furthermore, the snubber resistor may suppress any pulse of current generated by the snubber capacitor during closing operation of the MEMS switch 36. In certain other embodiments, the voltage snubber circuit 48 may include a metal oxide varistor (MOV) (not shown).

In accordance with further aspects of the present technique, a load circuit 50 may be coupled in series with the MEMS switch 36. The load circuit 50 may also include an external device 54 that is either being controlled or is sending signals to the PLC 20. In addition, the load circuit 50 may include a voltage source $V_{BUS}$ 52. The load circuit 50 may further have a load inductance 56 $L_{LOAD}$, where the load inductance $L_{LOAD}$ 56 is representative of a combined load inductance and a bus inductance viewed by the load circuit 50. The load circuit 50 may also include a load resistance $R_{LOAD}$ 58 representative of a combined load resistance viewed by the load circuit 40. Reference numeral 60 is representative of a load circuit current $I_{LOAD}$ that may flow through the load circuit 50 and the MEMS switch 36.

Further, as noted with reference to FIG. 2, the arc suppression circuitry 32 may include a balanced diode bridge. In the illustrated embodiment, a balanced diode bridge 62 is depicted as having a first branch 64 and a second branch 66. As used herein, the term "balanced diode bridge" is used to represent a diode bridge that is configured such that voltage drops across both the first and second branches 64, 66 are substantially equal. The first branch 64 of the balanced diode bridge 62 may include a first diode D1 68 and a second diode D2 70 coupled together to form a first series circuit. In a similar fashion, the second branch 66 of the balanced diode bridge 62 may include a third diode D3 72 and a fourth diode D4 74 operatively coupled together to form a second series circuit.

In one embodiment, the MEMS switch 36 may be coupled in parallel across midpoints of the balanced diode bridge 62. The midpoints of the balanced diode bridge may include a first midpoint located between the first and second diodes 68, 70 and a second midpoint located between the third and fourth diodes 72, 74. Furthermore, the MEMS switch 36 and the balanced diode bridge 62 may be tightly packaged to facilitate minimization of parasitic inductance caused by the balanced diode bridge 62 and in particular, the connections to the MEMS switch 36. It may be noted that, in accordance with exemplary aspects of the present technique, the MEMS switch 36 and the balanced diode bridge 62 are positioned relative to one another such that the inherent inductance between the MEMS switch 36 and the balanced diode bridge 62 produces a di/dt voltage less than a few percent of the voltage across the drain 38 and source 40 of MEMS switch 36 when carrying a transfer of the load current to the diode bridge 62 during the MEMS switch 36 turn-off which will be described in greater detail hereinafter. In one embodiment, the MEMS switch 36 may be integrated with the balanced diode bridge 62 in a single package or optionally, the same die with the intention of minimizing the inductance interconnecting the MEMS switch 36 and the diode bridge 62.

Additionally, the arc suppression circuitry 32 may include a pulse circuit 76 coupled in operative association with the balanced diode bridge 62. The pulse circuit 76 may be configured to detect a switch condition and initiate opening of the MEMS switch 36 responsive to the switch condition. As used herein, the term "switch condition" refers to a condition that triggers changing a present operating state of the MEMS switch 36. For example, the switch condition may result in changing a first closed state of the MEMS switch 36 to a second open state or a first open state of the MEMS switch 36 to a second closed state. A switch condition may occur in response to a number of actions including but not limited to a circuit fault or an ON/OFF request from CPU 22.

The pulse circuit 76 may include a pulse switch 78 and a pulse capacitor $C_{PULSE}$ 80 series coupled to the pulse switch 78. Further, the pulse circuit 76 may also include a pulse inductance $L_{PULSE}$ 82 and a first diode $D_P$ 84 coupled in series with the pulse switch 78. The pulse inductance $L_{PULSE}$ 82, the diode $D_P$ 84, the pulse switch 78 and the pulse capacitor $C_{PULSE}$ 80 may be coupled in series to form a first branch of the pulse circuit 76, where the components of the first branch may be configured to facilitate pulse current shaping and timing. Also, reference numeral 86 is representative of a pulse circuit current $I_{PULSE}$ that may flow through the pulse circuit 76.

In accordance with aspects of the exemplary embodiment, the MEMS switch 36 a first closed state to a second open state while carrying a current albeit at a near-zero voltage. This may be achieved through the combined operation of the load circuit 50, and pulse circuit 76 including the balanced diode bridge 62 coupled in parallel across contacts of the MEMS switch 36.

Figure 4:
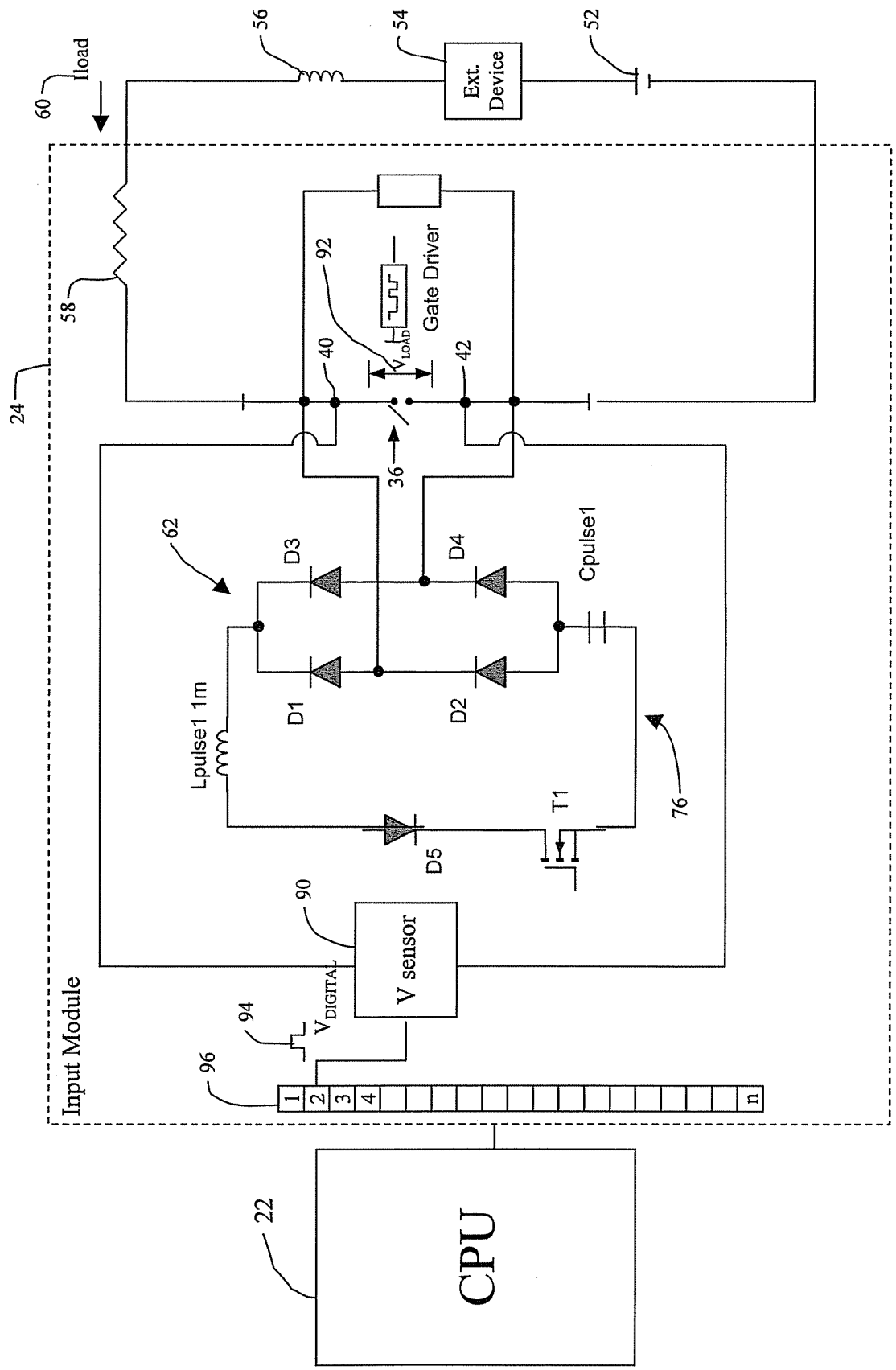
FIG. 4 is a schematic diagram of an exemplary MEMS based switching system input interface module in accordance with an exemplary embodiment depicted in FIG. 1.

With reference to FIG. 4, an exemplary embodiment input module 24 is illustrated. The input module 24 includes a MEMS switch 36 coupled in series with load circuit 50, diode circuit 62 and pulse circuit 76 as described above. An input module accepts a signal from the load circuit 50 and converts the load signal for use by the digital logic circuit of PLC 20. In this embodiment, a voltage sensing circuit 90 is coupled to the source 40 and drain 38 terminals of MEMS switch 36. A suitable voltage sensor measures the voltage across the MEMS switch 36. Reference numeral 92 is representative of a voltage potential $V_{LOAD}$ that may flow through the load circuit 50. The voltage potential 92 represents a signal generated by the external device 54, such as a temperature sensor or load cell for example. The voltage sensor 90 is coupled to terminal block 96 that connects the input module 24 to the CPU 22, through the PLC 20 backplane for example. The terminal block 96 has a plurality of terminals each of which is suitable for connection to an individual MEMS switch circuit 28.

The volt sensor may be any suitable voltage measuring circuit, such as a high resistance ammeter for example that can measure the expected range of voltages that will be experienced across the MEMS switch 36. The voltage circuit 90 generates a voltage signal $V_{DIGITAL}$ that is suitable for the digital logic circuit of the CPU 22. Reference numeral 94 is representative of a voltage signal $V_{DIGITAL}$ that is transmitted to the CPU 22. In the exemplary embodiment, the voltage signal 94 is proportional to the load voltage 92 and has a range from −5 VDC to +5 VDC. As discussed above, the CPU 22 is responsive to the voltage signal 94 and executes instructions based on the conditions indicated by the signal and produces an output data signal in response.

Figure 5:
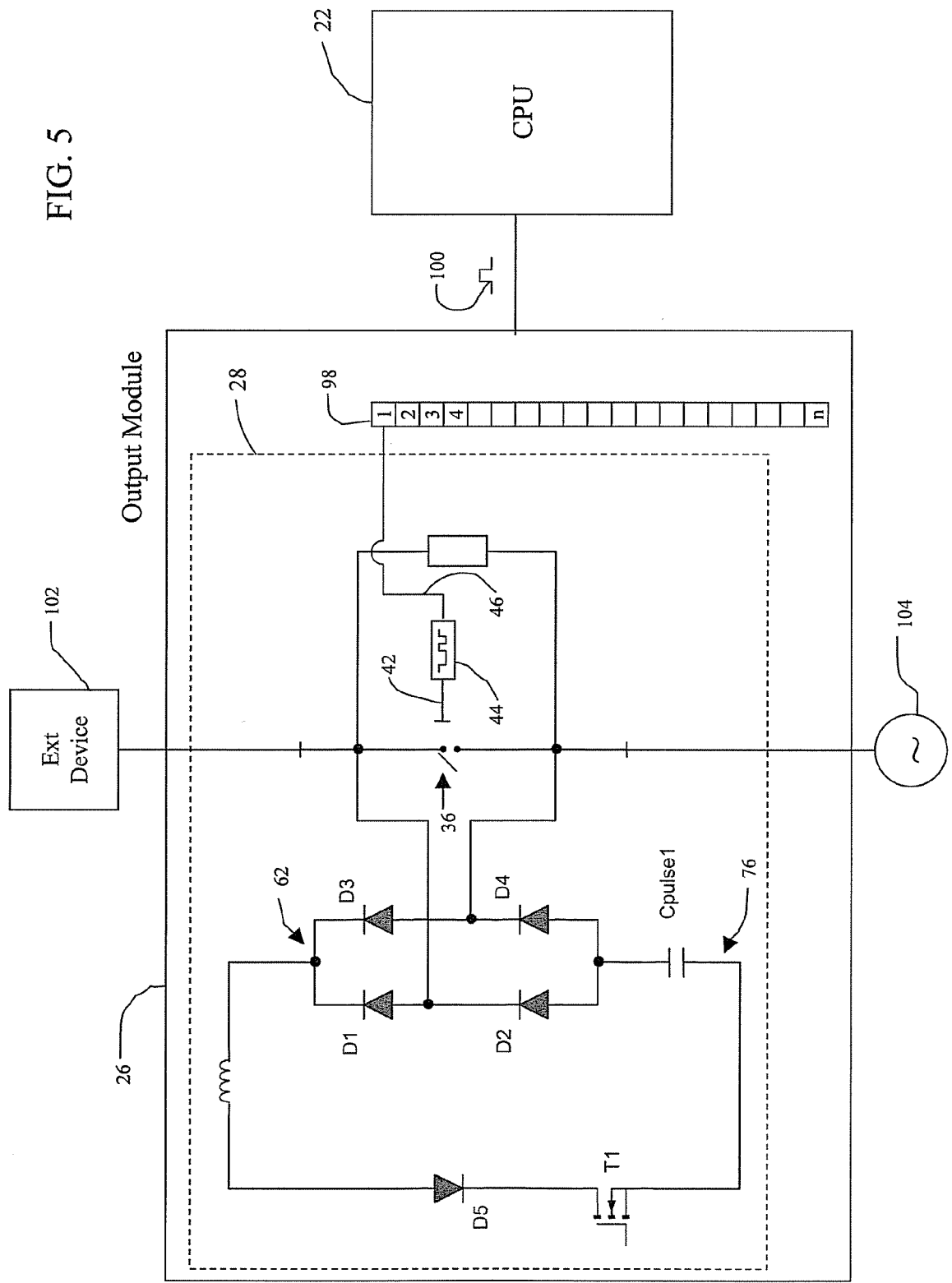
FIG. 5 is a schematic diagram illustrating the exemplary MEMS based switching system output interface module depicted in FIG. 3.

Turning now to FIG. 5, an exemplary embodiment output module 26 will be described. In response to the input signal 94, the CPU 22 executes control instructions to provide an output response, turning on a motor for example, that the system operator desires when the input condition is sensed or measured. The output signal is represented by the reference numeral 100. The output signal 100 is transmitted from the CPU 22 to a terminal block 98 in the output module 26. The output module is coupled to the PLC 20, via a backplane for example.

The output module 26 includes a MEMS based switching system 28 having a MEMS switch 36 coupled to a diode bridge 62 and a pulse circuit 76 as discussed above in reference to FIG. 3. In the exemplary embodiment, the MEMS switch 36 is coupled in series with an external device 102 and is arranged to connect and disconnect electrical power to the external device 102. It should be appreciated that the output module 26 may be utilized in many different applications with different types of external devices and that the functionality of connecting and disconnecting electrical power from the external device is for exemplary purposes and not intended to be limiting.

The output signal 100 is transmitted by the CPU 22 through the terminal block 98 and received by the gate driver control logic input 46. Depending on the nature of the output signal 100, the gate driver 44 either energizes or deenergizes gate connection 42 causing the MEMS switch 36 to close or open respectively. In the case where the MEMS switch 36 closes, electrical power can flow from a voltage source 104 to the external device 102. In the instance where the MEMS switch 26 opens, the flow of electrical power to the external device 102 is interrupted. As discussed above, the MEMS switch may have arc suppression circuitry 32 integrated into the circuit to protect the MEMS based switching system 28 and the PLC 20 from undesired electrical conditions that could damage the MEMS based switching system 28 or the digital logic circuits of the CPU 22.

It should be noted that while the input module 24 and the output module 26 have been described as discrete components coupled to the PLC 20, this has been done for exemplary purposes and to aid in describing the modules 24, 26. The input/output modules 24, 26 may also be incorporated in to a single component that is coupled to the PLC 20, through a backplane for example. Also, the individual MEMS based switching system 28 may be configured to provide both input and output interface functionality so that the configuration may be changed either late in the manufacturing process or in the field where the application is located. The change from an input interface to an output interface may be accomplished either through hardware, a dip switch for example, or via the control code executed on the CPU 22. The ability to reconfigure the MEMS based switching system 28 provides advantages in cost and installation time over the existing I/O modules that require replacement of dedicated hardware to accomplish the reconfiguration.

Figure 6:
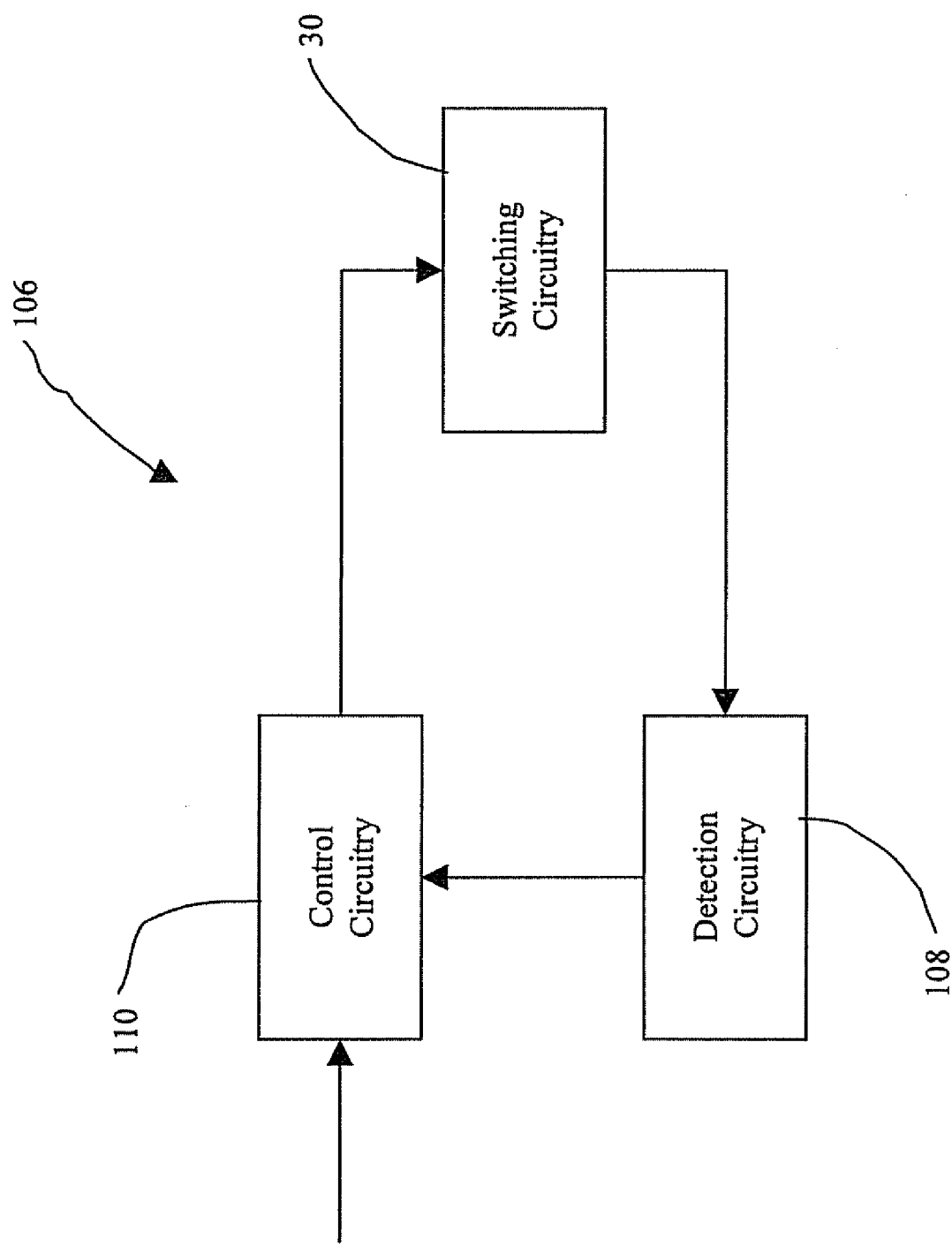
FIG. 6 is a block diagram of an exemplary MEMS based switching system in accordance with an exemplary embodiment.

Reference is now made to FIG. 6, which illustrates a block diagram of an exemplary soft switching system 106 for an output module 26, in accordance with aspects of the exemplary embodiment. As illustrated in FIG. 6, the soft switching system 106 includes switching circuitry 30, detection circuitry 108, and control circuitry 110 operatively coupled together. The detection circuitry 108 may be coupled to the switching circuitry 30 and configured to detect an occurrence of a zero crossing of an alternating source voltage in a load circuit (hereinafter "source voltage") connected to the external device or an alternating current in the load circuit (hereinafter referred to as "load circuit current"). The control circuitry 110 may be coupled to the switching circuitry 30 and the detection circuitry 108, and may be configured to facilitate arc-less switching of one or more switches in the switching circuitry 30 responsive to a detected zero crossing of the alternating source voltage or the alternating load circuit current. In one embodiment, the control circuitry 110 may be configured to facilitate arc-less switching of one or more MEMS switches comprising at least part of the switching circuitry 30.

In accordance with one aspect of the exemplary embodiment, the soft switching system 106 may be configured to perform soft or point-on-wave (PoW) switching whereby one or more MEMS switches in the switching circuitry 30 may be closed at a time when the voltage across the switching circuitry 30 is at or very close to zero, and opened at a time when the current through the switching circuitry 30 is at or close to zero. By closing the switches at a time when the voltage across the switching circuitry 30 is at or very close to zero, pre-strike arcing can be avoided by keeping the electric field low between the contacts of the one or more MEMS switches as they close, even if multiple switches do not all close at the same time. Similarly, by opening the switches at a time when the current through the switching circuitry 30 is at or close to zero, the soft switching system 106 can be designed so that the current in the last switch to open in the switching circuitry 30 falls within the design capability of the switch. As alluded to above and in accordance with one embodiment, the control circuitry 110 may be configured to synchronize the opening and closing of the one or more MEMS switches of the switching circuitry 30 with the occurrence of a zero crossing of an alternating source voltage or an alternating load circuit current.

Although for the purposes of description, FIG. 3, FIG. 4 and FIG. 5 illustrate the MEMS switch 36 as a single switch, the MEMS switch 36 may nonetheless include one or more MEMS switches depending upon, for example, the current and voltage handling requirements of the soft switching system 106. In one embodiment, the switching circuitry 30 may also include a switch module including multiple MEMS switches coupled together in a parallel configuration to divide the current amongst the MEMS switches. In yet a further embodiment, one or more MEMS switches of the switching circuitry 30 may be integrated into a single package.

Figure 7:
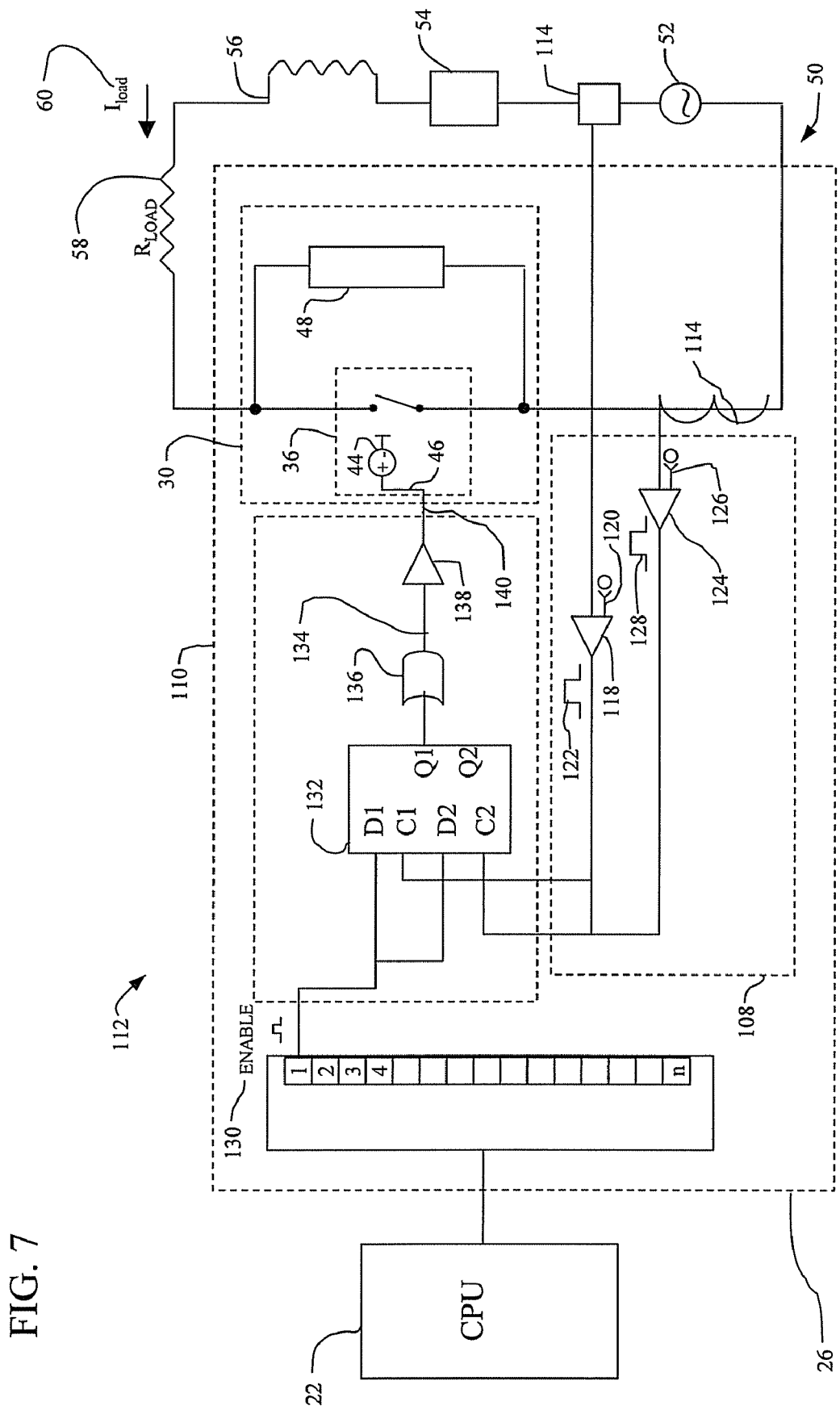
FIG. 7 is a schematic diagram of an exemplary MEMS based switching system output interface module in accordance with an exemplary embodiment and an alternative to the system depicted in FIG. 5.

Turning to FIG. 7, a schematic diagram 112 of one embodiment of the soft switching system 106 of FIG. 6 is illustrated. In accordance with the illustrated embodiment, the schematic diagram 112 includes one example of the switching circuitry 30, the detection circuitry 108 and the control circuitry 110. For further purposes of description, each of the MEMS switch 36 will be described with respect to MEMS switch as discussed above with reference to FIG. 3. In one embodiment, the control circuitry 108 may be coupled to the gate driver 44 via a control logic input 46 to facilitate switching a current state of the MEMS switch 36.

Additionally, the MEMS switch 36 may be coupled in series with a load circuit 50 as further illustrated in FIG. 7. In a presently contemplated configuration, the load circuit 50 that connects to the externally controlled device 54 and may also include a voltage source $V_{SOURCE}$ 52, and may possess a representative load inductance $L_{LOAD}$ 56 and a load resistance $R_{LOAD}$ 58. In one embodiment, the voltage source $V_{SOURCE}$ 52 (also referred to as an AC voltage source) may be configured to generate the alternating source voltage and the alternating load current $I_{LOAD}$ 60.

As previously noted, the detection circuitry 108 may be configured to detect occurrence of a zero crossing of the alternating source voltage or the alternating load current $I_{LOAD}$ 60 in the load circuit 50. The alternating source voltage may be sensed via the voltage sensing circuitry 114 and the alternating load current $I_{LOAD}$ 60 may be sensed via the current sensing circuitry 116. The alternating source voltage and the alternating load current may be sensed continuously or at discrete periods for example.

A zero crossing of the source voltage may be detected through, for example, use of a comparator, such as the illustrated zero voltage comparator 118. The voltage sensed by the voltage sensing circuitry 114 and a zero voltage reference 120 may be employed as inputs to the zero voltage comparator 116. In turn, an output signal 122 representative of a zero crossing of the source voltage of the load circuit 50 may be generated. Similarly, a zero crossing of the load current $I_{LOAD}$ 60 may also be detected through use of a comparator such as the illustrated zero current comparator 124. The current sensed by the current sensing circuitry 116 and a zero current reference 126 may be employed as inputs to the zero current comparator 124. In turn, an output signal 128 representative of a zero crossing of the load current $I_{LOAD}$ 60 may be generated.

The control circuitry 110, may in turn utilize the output signals 122 and 128 to determine when to change (for example, open or close) the current operating state of the MEMS switch 36. More specifically, the control circuitry 110 may be configured to facilitate opening of the MEMS switch 36 to interrupt or open the load circuit 50 responsive to a detected zero crossing of the alternating load current $I_{LOAD}$ 60. Additionally, the control circuitry 110 may be configured to facilitate closing of the MEMS switch 36 to complete the load circuit 50 responsive to a detected zero crossing of the alternating source voltage.

In one embodiment, the control circuitry 110 may determine whether to switch the present operating state of the MEMS switch 36 to a second operating state based at least in part upon a state of an Enable signal 130 transmitted from the CPU 22. The Enable signal 130 may be generated as a result of a power off command, for example. In one embodiment, the Enable signal 130 and the output signals 122 and 128 may be used as input signals to a dual D flip-flop 132 as shown. These signals may be used to close the MEMS switch 36 at a first source voltage zero after the Enable signal 130 is made active (for example, rising edge triggered), and to open the MEMS switch 136 at the first load current zero after the Enable signal 130 is deactivated (for example, falling edge triggered). With respect to the illustrated schematic diagram 112 of FIG. 7, every time the Enable signal 130 is active (either high or low depending upon the specific implementation) and either output signal 122 or 128 indicates a sensed voltage or current zero, a trigger signal 134 may be generated. In one embodiment, the trigger signal 134 may be generated via a NOR gate 136, for example. The trigger signal 134 may in turn be passed through a driver 138 to generate a gate activation signal 140 which may be used to apply a control voltage to the control logic input 46 of gate driver 44 in MEMS switch 36.

As previously noted, in order to achieve a desirable voltage rating for a particular application, the MEMS switch 36 may be operatively coupled in series with other MEMS switches. Each individual MEMS switch 36 has an electrical characteristic referred to as a hold-off voltage. This is the voltage at which the MEMS switch is changes state from either open to close, or close to open under the influence of the electrostatic forces present in the MEMS switch. A typical MEMS switch has a hold-off voltage of approximately 100V. In certain applications, however, it is desirable to operate at higher voltages, such as 400V for example. Since the MEMS switches 36 are arranged serially, the hold-off voltage for the pair is equal to the sum of the hold-off voltages for each individual MEMS switch. If the switches have the same hold-off voltage, 100V for example, the hold-off voltage for two MEMS switches 36 would be 2×, or 200V for example.

It should be appreciated, that MEMS switch 36 may include additional MEMS switches arranged in parallel therewith to provide additional capacity to carry current. The combined capabilities of the MEMS switches may be designed to both increase the hold-off voltage and adequately carry the continuous and transient overload current levels that may be experienced by the load circuit. For example, with a 10-amp RMS motor contactor with a 6× transient overload, there should be enough switches coupled in parallel to carry 60 amps RMS for 10 seconds. Using point-on-wave switching to switch the MEMS switches within 5 microseconds of reaching current zero, there will be 160 milliamps instantaneous, flowing at contact opening. Thus, for that application, each MEMS switch should be capable of "warm-switching" 160 milliamps, and enough of them should be placed in parallel to carry 60 amps. On the other hand, a single MEMS switch should be capable of interrupting the amount or level of current that will be flowing at the moment of switching.

Figure 8:
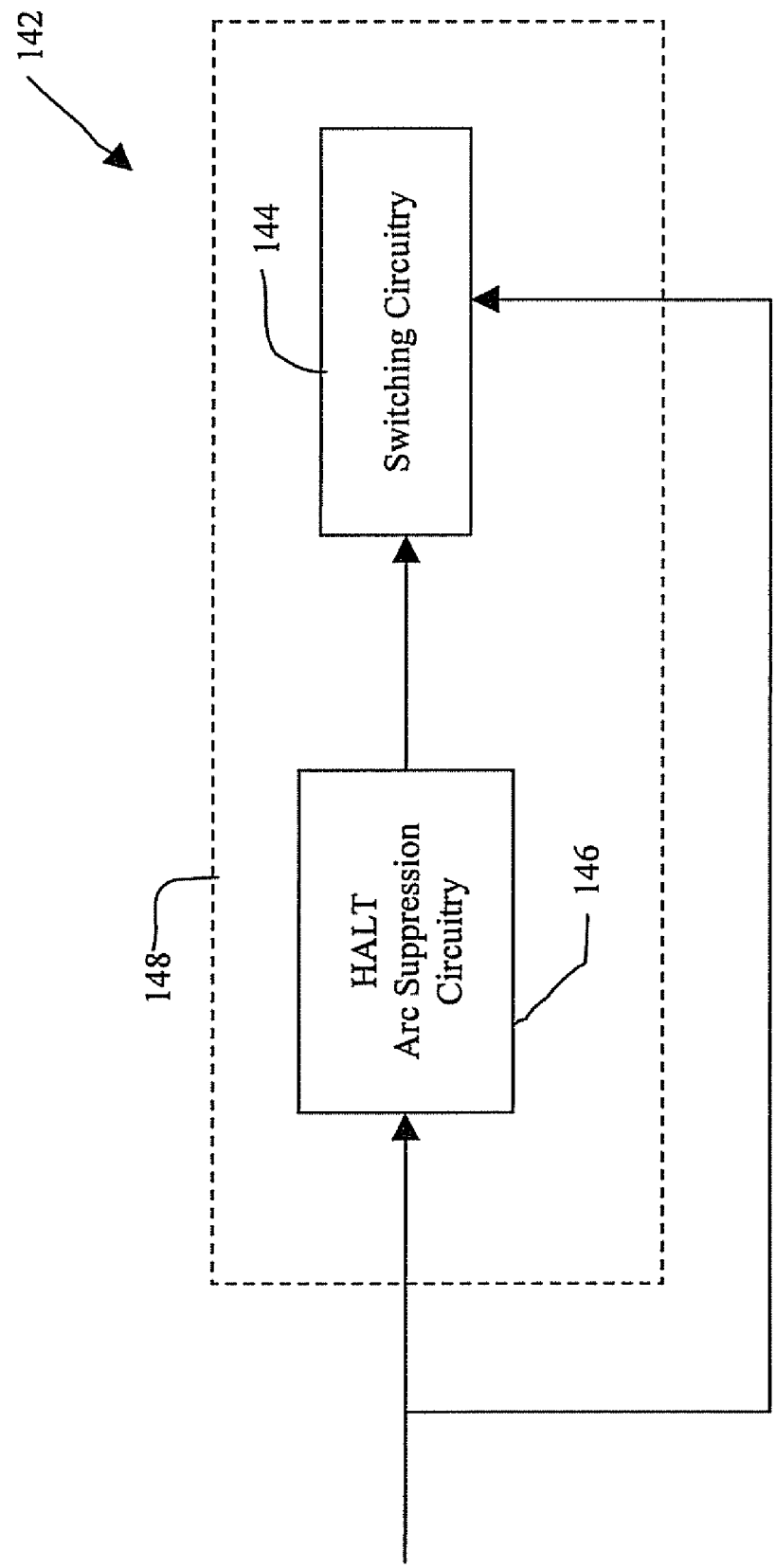
FIG. 8 is a block diagram of a MEMS based switching system having electrical fault protection in accordance with an exemplary embodiment; and, FIG. 9 is a block diagram of a PLC having arrays of MEMS based switching systems arranged in series and in parallel in accordance with an exemplary embodiment.

However, example embodiments are not limited to arcless switching of alternating current and/or sinusoidal waveforms. As depicted in FIG. 8, example embodiments are also applicable to arcless switching of direct current and/or currents without naturally occurring zeros.

FIG. 8 illustrates a block diagram of an exemplary MEMS based switching system 142 in accordance with an exemplary embodiment. As illustrated in FIG. 8, the arcless MEMS based switching system 142 is shown as including MEMS based switching circuitry 144 and arc suppression circuitry 146, where the arc suppression circuitry 146, such as HALT and PATO circuitry for example, is operatively coupled to the MEMS based switching circuitry 144. In some embodiments, the MEMS based switching circuitry 144 may be integrated in its entirety with the arc suppression circuitry 146 in a single package 148, for example. In other embodiments, only certain portions or components of the MEMS based switching circuitry 144 may be integrated with the arc suppression circuitry 146.

The MEMS based switching circuitry 144 may include one or more MEMS switches. Additionally, the arc suppression circuitry 146 may include a balanced diode bridge and a pulse circuit and/or pulse circuitry. Further, the arc suppression circuitry 146 may be configured to facilitate suppression of an arc formation between contacts of the one or more MEMS switches by receiving a transfer of electrical energy from the MEMS switch in response to the MEMS switch changing state from closed to open (or open to closed). It may be noted that the arc suppression circuitry 146 may be configured to facilitate suppression of an arc formation in response to an alternating current (AC) or a direct current (DC).

Figure 9:
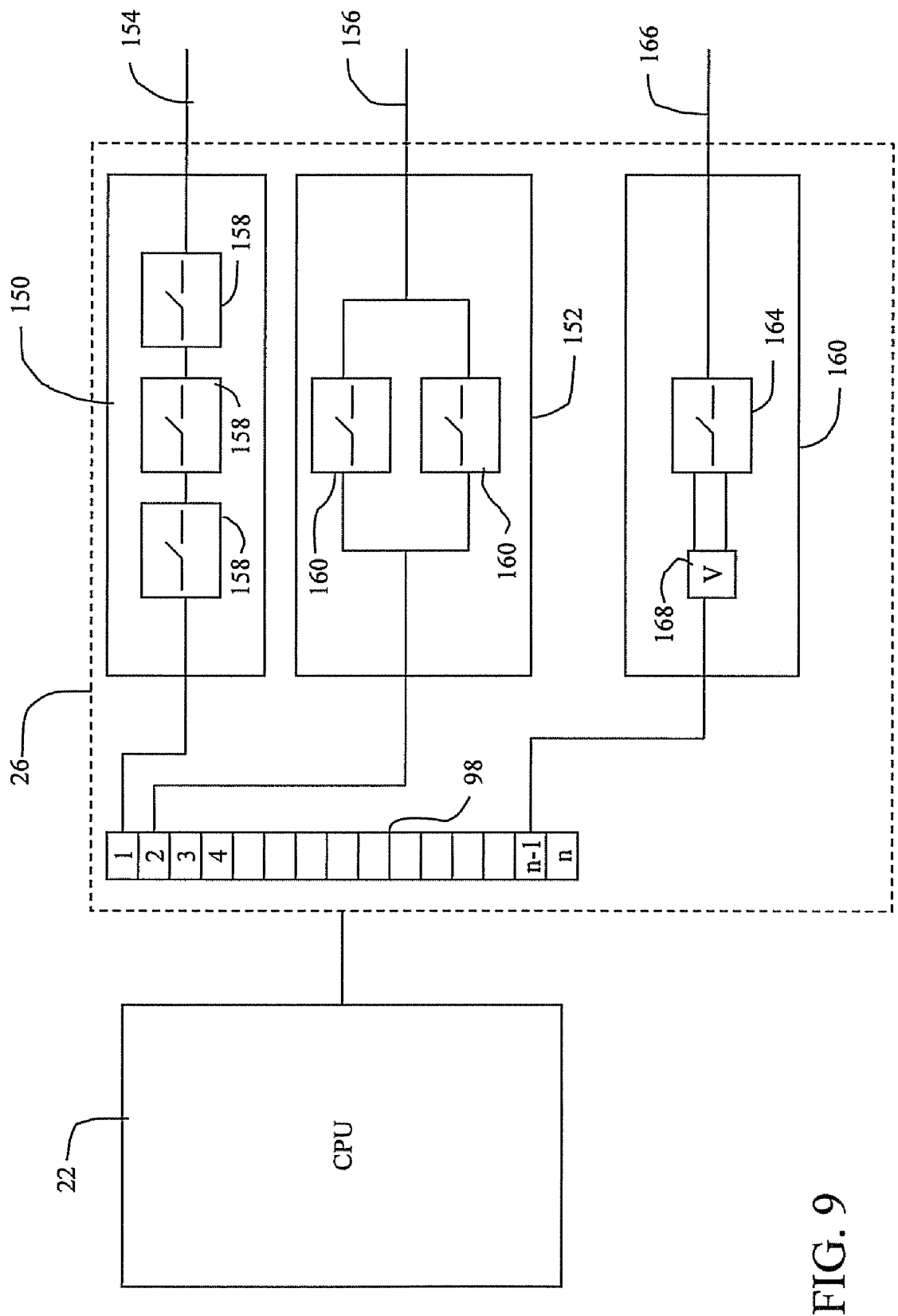

However, example embodiments are not limited to I/O modules including a single MEMS switch. For example, a plurality of MEMS switches may be used to achieve a different voltage rating, or different current handling capabilities, compared to a single MEMS switch pair. For example, as discussed above, a plurality of MEMS switches may be connected in parallel to achieve increased current handling capabilities. Similarly, a plurality of MEMS switches may be connected in series to achieve a higher voltage rating. Furthermore, a plurality of MEMS switches may be connected in a network including combinations of series and parallel connections to achieve a desired voltage rating and current handling capabilities. All such combinations are intended to be within the scope of the exemplary embodiment. Turning to FIG. 9, an example configuration of an output module 26 having multiple MEMS switches is illustrated.

FIG. 9 is a block diagram of a PLC 20 having an output module 26 configured in accordance with an exemplary embodiment. As illustrated in FIG. 9, two MEMS based switching systems 150, 152 are connected between the terminal block 98 and load circuits 154, 156 respectively. The load circuits 154, 156 are each connected to an external device that the system operator desires to control. A third MEMS based switching system 160 is connected to measure signals on external circuit 166. The CPU 22 in response to an input signal received through MEMS based switching system 160 may independently actuate each of the MEMS based switching system 150, 152.

As illustrated in FIG. 9, the MEMS based switching system 150 is coupled to terminal 1 in terminal block 98. The MEMS based switching system 150 is arranged with an array of MEMS switches 158 connected in series to provide a higher voltage standoff performance as needed for the load circuit 154. MEMS based switching system 152 is connected to terminal 2 in terminal block 98. MEMS based switching system 152 illustrates an array of MEMS switches 160 coupled in parallel to allow the usage in higher current applications. It should be appreciated that the PLC may have a plurality of MEMS based switching systems 150, 152 on output module 26 with each connected to a terminal on terminal block 98. Each of these respective MEMS based switching systems can be independently controlled by the CPU 22 as described herein.

The third MEMS based switching system 160 is arranged to receive signals from an external circuit 166. A MEMS switch 164 receives the signal as a voltage that is measured by voltage sensor 168 as has been described herein. The voltage sensor 168 is connected to terminal "n–1" in the terminal block 98 that allows the transmission of a digital signal from the MEMS based switching system 160 to the CPU 22. It should be appreciated that the third MEMS based switching system 160 may include multiple MEMS switches 164 arranged in series or in parallel in a similar manner as described above.

Therefore, the PLC 20 as described herein may include control circuitry integrally arranged with a current path, at least one MEMS switch disposed in the current path, a HALT circuit connected in parallel with the at least one MEMS switch facilitating arcless opening of the at least one MEMS switch, and a PATO circuit connected in parallel with the at least one MEMS switch pair facilitating arcless closing of the at least one MEMS switch.

Also, example embodiments provide methods of controlling an electrical current passing through a current path. For example, the method may include transferring electrical energy from at least one MEMS switch to a HALT circuit connected in parallel with the at least one MEMS switch to facilitate opening the current path. The method may further include transferring electrical energy from the at least one MEMS switch to a PATO circuit connected in parallel with the at least one MEMS switch to facilitate closing the current path. Therefore, the exemplary embodiments may also provide arcless current control devices, and methods of arcless current control.

Furthermore, while example embodiments contained herein discuss the combination of MEMS switches with arc suppression circuits, such as HALT or PATIO circuits for example, there exist applications that do not require such protection. In applications where the PLC 20 is used to monitor and control digital devices for example, meaning devices that operate on a −5 VDC to +5 VDC logic circuit, such protective circuits may not be necessary. Accordingly, for these applications, the arc suppression circuits may be removed to save on cost and to reduce the size of the I/O modules.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A programmable logic controller comprising:
  a central processing unit;
  a digital input/output interface operably coupled to said central processing unit, said digital input/output interface having at least one input terminal and at least one output terminal; and
  a micro-electromechanical system ("MEMS") switch connected to each of said at least one input terminal and to each of said at least one output terminal, thereby defining input MEMS switches and output MEMS switches, each MEMS switch having a source connection, a drain connection and gate connection.

2. The programmable logic controller of claim 1 wherein each MEMS switch further comprises a gate driver coupled to its respective gate connection.

3. The programmable logic controller of claim 2 wherein said gate drivers of said output MEMS switches are coupled to a driver circuit electrically facilitating opening of said output MEMS switches.

4. The programmable logic controller of claim 3 wherein each of said input MEMS switch is coupled to a sensing circuit for sensing the voltage across said switch.

5. The programmable logic controller of claim 4 wherein each of said gate driver is configured to change a state of its associated MEMS switch in response to a signal from said central processing unit.

6. The programmable logic controller of claim 5 wherein each of said input and output MEMS switches are further coupled to a hybrid arcless limited technology (HALT) circuit.

7. An input/output interface module for a programmable logic controller comprising:
  a programmable logic controller interface;
  at least one interface terminal electrically coupled to said controller interface;
  at least one MEMS switch connected to said interface terminal, said MEMS switch having a source connection, a drain connection and a gate connection;
  a gate driver coupled to each of said MEMS switch; and,
  a circuit electrically connected with said gate driver switch facilitating opening of said MEMS switch.

8. The input/output interface module for a programmable logic controller of claim 7 wherein said gate driver is electrically coupled to said controller interface.

9. The input/output interface module for a programmable logic controller of claim 8 wherein said MEMS switch is an array having a plurality of MEMS switches.

10. The input/output interface module for a programmable logic controller of claim 9 wherein the plurality of MEMS switches in said MEMS switch array are arranged in a serial connection.

11. The input/output interface module for a programmable logic controller of claim 9 wherein the plurality of MEMS switches in said MEMS switch array are arranged in a parallel connection.

12. The input/output interface module for a programmable logic controller claim 8 wherein said circuit is a HALT circuit.

13. The input/output interface module for a programmable logic controller of claim 12 wherein said HALT circuit is configured to receive a transfer of electrical energy from the MEMS switch in response to the MEMS switch changing state from closed to open.

14. The input/output interface module for a programmable logic controller of claim 8 further comprising a sensing circuit electrically coupled to said MEM switch, said sensing circuit being arranged to measure the voltage between said MEMS switch source and drain connections when said MEMS switch is in an open position.

15. A programmable logic controller comprising:
a central processing unit:
an interface module electrically coupled to said central processing unit wherein said interface module includes:
at least one first MEMS switch having a drain connection, a source connection and a gate connection; and,
a gate driver operably coupled to said first MEMS switch and electrically coupled to receive a first logic signal from said central processing unit.

16. The programmable logic controller of claim 15 wherein said interface module further comprises:
a second MEMS switch having a drain connection, a source connection, and a gate connection; and,
a sensing circuit electrically coupled to measure the voltage between said second MEMS switch drain connection and source connection.

17. The programmable logic controller of claim 16 wherein said sensing circuit is configured to transmit a second logic signal to said central processing unit.

18. The programmable logic controller of claim 15 wherein said interface module further includes a third MEMS switch having a drain connection, a source connection and a gate connection, said third MEMS switch being electrically coupled in series to said first MEMS switch.

19. The programmable logic controller of claim 15 further comprising a third MEMS switch having a drain connection, a source connection and a gate connection, said third MEMS switch being electrically coupled in parallel with said first MEMS switch.

20. The programmable logic controller of claim 15 wherein said gate driver is configured to change the state of said first MEMS switch in response to said first logic signal.

* * * * *

UNITED STATES PATENT AND TRADEMARK OFFICE
CERTIFICATE OF CORRECTION

PATENT NO.        : 7,839,611 B2                                Page 1 of 1
APPLICATION NO.   : 11/939729
DATED             : November 23, 2010
INVENTOR(S)       : Rivers, Jr. et al.

It is certified that error appears in the above-identified patent and that said Letters Patent is hereby corrected as shown below:

In Column 13, Line 10, in Claim 12, after "controller" insert -- of --, therefor.

In Column 13, Line 18, in Claim 14, delete "MEM" and insert -- MEMS --, therefor.

In Column 13, Line 23, in Claim 15, delete "unit:" and insert -- unit; --, therefor.

Signed and Sealed this
Fifth Day of April, 2011

David J. Kappos
*Director of the United States Patent and Trademark Office*